Feb. 24, 1953 — J. F. CACHAT — 2,629,811
APPARATUS FOR PRESSURE WELDING OF SEAMS OR EDGES
Filed Feb. 15, 1950
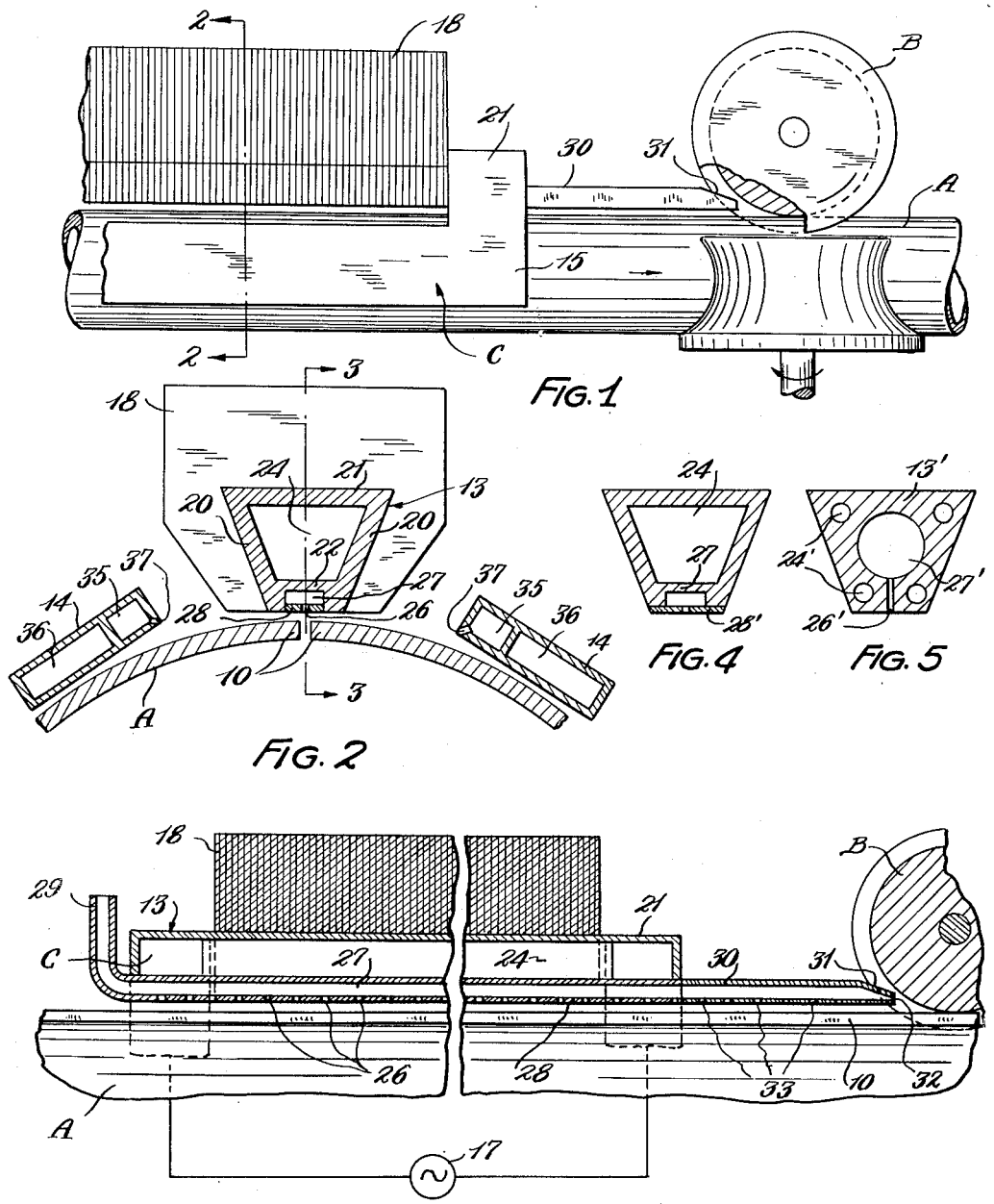
INVENTOR.
JOHN F. CACHAT
BY
ATTORNEY Patented Feb. 24, 1953

2,629,811

UNITED STATES PATENT OFFICE 2,629,811

APPARATUS FOR PRESSURE WELDING OF SEAMS OR EDGES

John F. Cachat, Cleveland, Ohio, assignor to The Ohio Crankshaft Company, Cleveland, Ohio, a corporation of Ohio Application February 15, 1950, Serial No. 144,210

3 Claims. (Cl. 219—47)

This invention pertains to the art of heating metal for pressure welding and, more particularly, to apparatus for progressively heating the edges of plate or skelp employing high-frequency induction heating.

The invention is particularly adaptable to where any contamination of the edges to be welded, such as with stainless steel, prevents a sound weld or, in the more drastic situation, any weld at all. Heretofore, insofar as I am aware, stainless steels have never been successfully pressure welded. Simply enclosing the edges of the material in a protective gaseous atmosphere has not been sufficient to accomplish the desired results.

The present invention contemplates apparatus for effecting a butt weld including a high-frequency inductor extending in close-spaced parallel relationship to the edges to be welded and having in its edge-adjacent surface a plurality of openings through which a suitable gaseous atmosphere may be projected onto and across the heated edges.

The inductor is intended to be spaced from the welding rolls a short distance but has an extension extending substantially up to the rolls themselves so that the gas may be projected onto the edges until they are brought into welding engagement.

In partial explanation, but without limitation of the invention, it is believed that the gas expands slightly as it leaves the passages and tends to effect a slight cooling action of the outermost film on the metal while the high-frequency induced currents are heating the metal from underneath this film. Thus, in effect, the outermost film on the surface remains at a temperature slightly below that of the interior portions of the edges and this film is, therefore, subject to a lesser corrosive action than if allowed to reach the full temperature. However, either before or as the edges are pressed into abutment, the flow of gas thereon and its cooling action is stopped and the film substantially immediately heats to the elevated temperature of the inner portions of the metal. Additionally, the gas at high velocities is believed to have a scourging action as it flows over the edges tending to clean them and prepare them for an improved weld.

The principal object of the invention is the provision of a new and improved apparatus for effecting seam welds on stainless steel.

A further object of the invention is the provision of a high-frequency inductor particularly adapted for seam welding stainless-steel strip into stainless-steel pipe, including a conductor adapted to extend parallel to the edges in current-inducing relationship therewith and having means for projecting gaseous atmosphere onto the edges as they heat.

A further object is the provision of a new and improved apparatus for preparing the edges of skelp for pressure welding by welding rolls including a high-frequency inductor spaced from the welding rolls and having means extending toward rolls in the intervening space for projecting a gas onto the edges after the strip has left the inductor and before passing into the inductor rolls.

The invention may take a number of different physical forms, differing radically in appearance and construction. For the purposes of disclosing the invention, a preferred physical embodiment will be described in this specification and illustrated in the accompanying drawing which is a part hereof, and wherein:

Figure 1 is a side elevational view with portions broken away for the purposes of clarity, of apparatus embodying the invention and for carrying out the method thereof:

Figure 2 is a sectional view of Figure 1 taken on the line 2—2 thereof;

Figure 3 is a sectional view of Figure 2 taken on the line 3—3 thereof;

Figure 4 is a cross-sectional view of the main or principal conductor but showing a construction modified from that of Figure 2; and Figure 5 is a view similar to Figure 4 showing a still further modified construction.

Referring now to the drawings wherein the preferred embodiment shown is for the purpose of illustration only and not for limiting the scope of the invention, Figures 1 and 2 show a pipe A moving from left to right past a high-frequency inductor C disposed adjacent the pipe so as to heat the edges to be welded to a welding temperature and a pair of pressure-welding rolls B for pressing the heated edges into welding engagement.

The pipe A is shown schematically only and is comprised of a strip of sheet metal formed by known means into a C-shaped cross section with a pair of spaced opposed edges 10 to be heated to the welding temperature and welded.

The pipe A may be of any desired material but the invention is particularly adapted for the welding of the edges 10 when the pipe is comprised of a stainless-steel material which, insofar as I know, cannot be welded except in a protective atmosphere.

The welding rolls B form no part of the present invention except as they are positioned in relationship to the high-frequency inductor to complete the job of welding that the inductor begins by heating the edges to a welding temperature. These rolls are conventional in construction and may be of the driven or idler type as desired.

The high-frequency inductor C shown is similar in its basic outline in many respects to the construction of the high-frequency inductor shown in the copending application of Phillips N. Sorenson, Serial No. 86,066, filed April 7, 1949. Here, as in that application, the inductor consists of a main or central conductor 13 which extends in a close-spaced parallel relationship to the edges 10 for a substantial distance, a pair of side conductors 14 which extend in close-spaced parallel relationship to the sides of the pipe A and parallel to the conductor 13 and end conductors 15 which extend circumferentially of the pipe and interconnect the ends of the conductors 13 and 14.

These conductors are adapted to have high-frequency electric currents circulated therethrough from a suitable source of high-frequency current shown schematically at 17 with the side conductors 14 being in parallel electrical relationship to each other and in series electrical relationship with the conductor 13. Thus, the current in the conductor 13 will be twice that in either conductor 14.

The main conductor 13 has preferably a plurality of magnetically-permeable laminations 18 over substantially its entire length, the purpose of which is to concentrate the high-frequency flux caused by the high-frequency currents flowing in the main conductor 13. This flux threads across the bottom face of the conductor 13 and through the edges 10 and induces concentrated high-frequency currents to flow in and parallel to the edges. These currents flow at and slightly beneath the surface of the edges. In effect, the heat is generated below the surface.

The main conductor 13 in the embodiment shown has a generally trapezoidal cross-sectional shape and includes angularly-disposed side walls 20, an upper wall 21 and a lower wall 22. These walls define a hollow interior chamber 24 through which cooling water may be circulated to remove any heat caused by $I^2R$ losses in the conductor 13. The bottom wall 22 may be somewhat thicker than the other walls and is the wall of the conductor 13 which is closest to the edges 10.

The wall 22 has plurality of openings 26 in its edge-adjacent surface along the length thereof which communicate with a passage 27 interiorly of the conductor 13.

A tube or pipe 29 is fixed to the left-hand side of the inductor C so as to form an extension of the passage 27. This tube 29 is adapted to extend by suitable extensions to connect with a source of a suitable gas under pressure. The pipe 29 may be fixed to the inductor by any suitable means such as brazing or the like. The gas employed may be of any reducing or nonoxidizing type so that when projected on the edges 10 in the heated state, the gas will prevent oxidization or other disintegration of the metal on the edges. In a practical embodiment of the invention, hydrogen type of gas was employed. It is presumed that other types of gas would also be satisfactory.

The openings 26 are preferably positioned centrally along the length of the bottom wall 22 and may be spaced and have a size as necessary to provide a passage for gas from the passage 27 onto and across the edges 10. If necessary, the holes 26 may instead be a continuous slot. In one embodiment of the invention, $\frac{1}{16}$ of an inch diameter holes were provided every ¼ inch along the entire length of the conductor 13.

In the embodiment shown, the passage 27 is formed in the bottom wall 22 by forming a groove in the bottom surface of the wall 22 which is then covered by a cover member 28 placed into position over the groove to form the passage 27. The holes 26 are formed in the cover member.

The gas is supplied to the passage 27 under a pressure sufficient to provide a scourging action as the gas is projected onto the heated edges 10.

A pipe 30 is fixed to the right-hand side of the inductor C and provides an extension for the passage 27 to the right of the inductor C. This tube 30 extends over to a point immediately adjacent the welding rolls B and, as shown at 31, tapers slightly so as to permit as close an approach to the welding rolls B as possible. The tapered end preferably has an opening 32 through which gas may be projected into the crevices formed by the curved surfaces of the welding rolls. The tube 30 is provided with a plurality of openings 33 along its lower edge, similarly positioned and disposed to the holes 26 under the main conductor 13. It is preferred that the pipe 30 be formed of a nonmetallic material. In some instances, undesirable heating occured under the pipe.

In the preferred embodiment shown, the side conductors 14 are also provided with means for projecting a reduced gaseous atmosphere toward the edges 10, although in some instances such a means will not be necessary. Thus, in the embodiment shown, each side conductor 12 has a pair of passages 35, 36. The passage 36 is conventional and is provided for the purpose of flowing cooling water through the conductors. The passage 35 has a similar function to the passage 27. The conductors 14 also have a plurality of passages or openings 37 communicating with the passage 35 and arranged and located so as to permit gases to be projected from the passage 35 onto the pipe A in the vicinity of and toward the edges 10.

In operation, the inductor is energized from a suitable source of high-frequency currents such as a ten thousand cycle motor-alternator. The pipe A is moved rapidly from left to right by suitable driving rolls not shown. The currents flowing in the conductor 13 induce currents to flow in and below the surfaces of the edges 10 underneath the conductor 13. Reducing gases supplied to the passage 27 under pressure flow out of the openings 26 and 37 onto the edges 10. Thus, currents are induced to flow simultaneously in the edges to heat the edges rapidly while, at the same time, the gases flow rapidly across the heated edges excluding any oxygen from the edges or other gases which might contaminate the heated edges. Also, the gases flowing across the edges 10, it is believed, serve as a scourging or fluxing medium to clean the surfaces and prepare them for a proper weld when they are abutted together.

In some instances in employing the present invention, it has been found desirable to enclose the inductor pipe and weld rolls in a generally gas-tight housing. This serves to further exclude contaminating gases from the area of the weld and also to prevent unnecessary wastage of the protective gas employed. Also, a plug interiorly of the pipe may be employed which will permit the passage of the gases over the edges but will generally prevent the escape thereof along the inside of the pipe.

It will be appreciated that the embodiment described is subject to many modifications and alterations while still remaining within the scope of the invention. As an example, without limitation, the cover 28' for the passage 27 is shown in Figure 4 as extending the full width of the lower surface of the main conductor 13 and brazed thereto. In Figure 5, the gas passage 27' is formed generally centrally of the main conductor 13' by drilling or the like and the openings or passages 26' are drilled from the work-facing surface of the conductor to this passage. With such a construction, cooling-medium passages 24' are formed or drilled lengthwise interiorly of the conductor. With the construction shown in Figure 5, it will be appreciated that the conductor 13' may be formed in its entirety from a single solid piece of material with the attendant economies of production.

In accordance with the patent statutes, my invention is described herein as taking physical form in a specific embodiment. Obviously, modifications and alterations differing radically in appearance and form from the embodiment will occur to others upon a reading and understanding of this disclosure. It is my intention to include such modifications and alterations insofar as they come within the scope of the appended claims.

Having thus described my invention, I claim:

1. A high-frequency inductor for heating to the welding tempertaure the opposed, close-spaced, parallel edges of metallic strip comprising a generally straight, elongated conductor having a workpiece-adjacent surface adapted to be disposed in close-spaced parallel relationship to said edges, said conductor having an interior passage extending over generally its entire length and a plurality of openings in the workpiece-adjacent surface communicating with said passage and a source of gas communicating with said passage for supplying gas thereto to be projected through said openings onto said edges, a pipe on one end of said conductor forming an extension of said passage and having a plurality of openings on the workpiece-adjacent side of said pipe whereby gas may be projected onto said edges after said strip has passed from beneath said conductor.

2. In combination, a high-frequency inductor and welding rolls adapted to respectively heat and pressure weld the close-spaced parallel edges of C-shaped metallic strip, said inductor comprising a conductor adapted to be spaced from said welding rolls but in alignment therewith and having a workpiece-adjacent surface, a hollow elongated member extending from said conductor in the intermediate space between said conductor and said rolls, said conductor and member having a continuous interior passage communicating with a source of gas, the workpiece-adjacent surface of said conductor and said member having a plurality of aligned openings through which gas may be projected onto the edges of said strip.

3. A high-frequency inductor for heating the close-spaced parallel edges of a generally C-shaped metallic strip comprising three spaced parallel conductors including a central or main conductor and two side conductors, said main conductor having a workpiece-adjacent surface adapted to be in closed-spaced parallel relationship with said edges, said main workpiece-adjacent surface having a plurality of heating passages parallel to said conductor through which a gas may be projected onto said edges, said side conductors having in their main conductor-adjacent side a plurality of openings communicating with a passage parallel to said conductor through which gas may be projected onto the sides of said strip in a direction towards said edges.

JOHN F. CACHAT.

REFERENCES CITED

The following references are of record in the file of this patent:

UNITED STATES PATENTS

| Number | Name | Date |
| --- | --- | --- |
| 1,842,461 | Sessions | Jan. 26, 1932 |
| 2,367,715 | Chapman | Jan. 23, 1945 |
| 2,439,517 | Johnson | Apr. 13, 1948 |
| 2,475,348 | Black | July 5, 1949 |
| 2,528,758 | King | Nov. 7, 1950 |